United States Patent
Yue

(10) Patent No.: US 8,340,269 B2
(45) Date of Patent: Dec. 25, 2012

(54) METHOD, DEVICE, AND SYSTEM FOR PROCESSING MULTI-CHANNEL AUDIO SIGNALS

(75) Inventor: Zhonghui Yue, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 8 days.

(21) Appl. No.: 13/174,318

(22) Filed: Jun. 30, 2011

(65) Prior Publication Data

US 2011/0261943 A1    Oct. 27, 2011

Related U.S. Application Data

(63) Continuation of application No. PCT/CN2009/076267, filed on Dec. 30, 2009.

(30) Foreign Application Priority Data

Dec. 30, 2008 (CN) .......................... 2008 1 0187365

(51) Int. Cl.
  *H04M 3/42* (2006.01)
(52) U.S. Cl. .................. 379/202.01; 370/260; 709/204; 709/227
(58) Field of Classification Search ............. 379/202.01; 370/260; 709/204, 227
See application file for complete search history.

(56) References Cited

U.S. PATENT DOCUMENTS

| | | | |
|---|---|---|---|
| 6,008,838 A | 12/1999 | Iizawa | |
| 7,007,098 B1 | 2/2006 | Smyth et al. | |

FOREIGN PATENT DOCUMENTS

| | | |
|---|---|---|
| CN | 1510898 A | 7/2004 |
| CN | 1941891 A | 4/2007 |
| CN | 1946029 A | 4/2007 |
| CN | 101179693 A | 5/2008 |
| CN | 101466043 A | 6/2009 |
| WO | WO 2008/011902 A1 | 1/2008 |
| WO | WO 2010/075790 A1 | 7/2010 |

OTHER PUBLICATIONS

Supplementary European Search Report received in European Application No. 09836077.9, mailed Mar. 7, 2012, 8 pages.
Chinese Office Action, Chinese Application No. 200810187365.4, Dated: Feb. 12, 2010, 17 pages.
Written Opinion of the International Searching Authority, International Application No. PCT/CN2009/076267, Applicant: Huawei Device Co., Ltd., et al., Dated: Apr. 8, 2010, 6 pages.

*Primary Examiner* — Quynh Nguyen
(74) *Attorney, Agent, or Firm* — Slater & Matsil, L.L.P.

(57) ABSTRACT

A method for processing multi-channel audio signals includes receiving L channel audio signals from participating conference terminals, decoding the L channel audio signals, and determining N conference terminals whose audio signals are to be mixed from the participating conference terminals according to the data obtained through decoding; selecting an encoder as a common encoder from L−N encoders of the participating conference terminals except the N conference terminals whose audio signals are to be mixed, encoding decoded audio signals of the N conference terminals whose audio signals are to be mixed, and sending encoded data to conference terminals corresponding to the L−N encoders (indicating that the number of encoders is equal to the value of L minus N); and updating encoding status information of L−N−1 encoders except the common encoder to synchronize with encoding status information of the common encoder.

6 Claims, 5 Drawing Sheets

Choosing M new conference terminals whose audio signals are to be mixed from the participating conference terminals, where the M new conference terminals whose audio signals are to be mixed and the N original conference terminals whose audio signals are to be mixed include S same conference terminals; and ⸺ S21

When encoding status information of encoders corresponding to N-S conference terminals (indicating that the number of conference terminals is equal to the value of N minus S) among the N original conference terminals whose audio signals are to be mixed except encoders corresponding to the S same conference terminals is consistent with the encoding status information of the encoders corresponding to the new conference terminals whose audio signals are to be mixed, stopping sending signals, and incompletely encoding decoded audio signals of the M new conference terminals whose audio signals are to be mixed. ⸺ S22

FIG. 3

METHOD, DEVICE, AND SYSTEM FOR PROCESSING MULTI-CHANNEL AUDIO SIGNALS

This application is a continuation of International Application No. PCT/CN2009/076267, filed on Dec. 30, 2009, which claims priority to Chinese Patent Application No. 200810187365.4, filed on Dec. 30, 2008, both of which are hereby incorporated by reference in their entireties.

TECHNICAL FIELD

The present invention is related to a method and device for signal processing, and in particular, to a method, device, and system for processing multi-channel audio signals.

BACKGROUND

At present, all multimedia services need processing of multi-channel audio signals. For example, a video-conferencing system often consists of more than two participating conference terminals. Therefore, multiple audio signals are involved. A device, such as a multipoint control unit (MCU), is required for processing and controlling the multiple audio signals to mix the multiple audio signals transmitted by conference terminals. Take three conference terminals, which are top three high-volume ones and can speak at the same time, for example. The handling process is as follows:

In prior art 1, the encoders of the MCU are in one to one correspondence with participating conference terminals. That is, the number of encoders is equivalent to the number of conference terminals. An encoder corresponding to a conference terminal, whose volume is not top three, encodes the audio signals of the three conference terminals, which are top three high-volume ones and can speak at the same time, and sends the encoded signals to the corresponding conference terminals. That is, all encoders of the MCU fully encode signals. However, when all encoders continuously and fully encode signals, the system processing capability is wasted, the cost is increased, and the supported capacity and the number of conference terminals are reduced;

In prior art 2, the number of encoders of the MCU can be one more than the maximum number of conference terminals that can speak at the same time. One encoder is selected as a fixed encoder. Take three conference terminals, which are top three high-volume ones and can speak at the same time, for example. The MCU uses four encoders, one among which is selected as a fixed encoder to fully encode the audio signals of the three conference terminals, which are top three high-volume ones and can speak at the same time, and send the encoded audio signals to a rest conference terminal whose volume is not top three The other three encoders are used to encode the audio signals of two conference terminals in the three conference terminals, which are top three high-volume ones and can speak at the same time (the audio signals of the two conference terminals indicate the audio signals of the other two conference terminals in the three conference terminals, which are top three high-volume ones and can speak at the same time, except the conference terminal corresponding to the current encoder), and send the signals to the corresponding conference terminals. When the three conference terminals, which are top three high-volume ones and can speak at the same time, are changed, the encoded audio signals of the new three conference terminals, which are top three high-volume ones and can speak at the same time, are transmitted by the fixed encoder, and the audio signals of the new three conference terminals, which are top three high-volume ones and can speak at the same time, are encoded by the corresponding three new encoders. The encoding status information of an encoder needs to be reserved during encoding. For example, an encoder in the Advanced Audio Coding (AAC) protocol needs to reserve the first two frames of encoded data as the encoding status information to predict the current frame encoding. In addition, the encoders of the conference terminals, that is, signal sources, need to decode the signals encoded by encoders. Therefore, the decoding status information of a decoder is related to the encoding status information of an encoder. If the encoding status information is inconsistent, the signals encoded by different encoders are sent to a same decoder. The decoder cannot decode the current data or the sound effect after decoding is poor because the current decoded data is inconsistent with the predicted data in the last frame. Therefore, when the speaking conference terminal is changed, the encoder is switched. As a result, the decoder cannot correctly decode the signals, and the sound effect is poor especially during free discussion. Therefore, in the prior art 2, when the three conference terminals, which are top three high-volume ones and can speak at the same time, are changed, the decoder of the conference terminal cannot decode the signals correctly, resulting in poor sound effect.

When implementing the present invention, the inventor finds at least the following defects in prior arts:

Prior art 1: The system processing capability is wasted, the cost is increased, and the capacity and number of signal sources supported by the MCU are reduced.

Prior art 2: When the speaking conference terminal is changed, the encoder of the MCU is switched. As a result, the decoder cannot correctly decode the signals, and the sound effect is poor especially during free discussion.

SUMMARY OF THE INVENTION

The purpose of the embodiment in the present invention is to provide a method, device, and system for processing multi-channel audio signals to save processor resources and ensure sound effects.

A method for processing multi-channel audio signals is provided in an embodiment of the present invention. The method includes:

receiving L-channel audio signals from participating conference terminals, decoding the L-channel audio signals, and determining N conference terminals whose audio signals are to be mixed from the participating conference terminals according to the data obtained through decoding, where L and N are natural numbers and $L > N > 0$;

selecting an encoder as a common encoder from L−N encoders (indicating that the number of encoders is equal to the value of L minus N) of the participating conference terminals except the N conference terminals whose audio signals are to be mixed, encoding decoded audio signals of the N conference terminals whose audio signals are to be mixed, and sending encoded data to conference terminals corresponding to the L−N encoders (indicating that the number of encoders is equal to the value of L minus N); and updating encoding status information of L−N−1 encoders (indicating that the number of encoders is equal to the value of L minus (N+1)) except the common encoder among the L−N encoders (indicating that the number of encoders is equal to the value of L minus N) to synchronize with encoding status information of the common encoder when $L - N > 1$ (L−N indicates that L subtracts N).

A device for processing multi-channel audio signals is provided in an embodiment of the present invention. The device includes:

L encoders in one-to-one correspondence with participating conference terminals;

a processing unit, configured to receive L-channel audio signals from the participating conference terminals and decode the L-channel audio signals respectively;

a choosing unit, configured to determine N conference terminals whose audio signals are to be mixed from the participating conference terminals according to data obtained through decoding;

a selecting unit, configured to select an encoder as a common encoder from L−N encoders (indicating that the number of encoders is equal to the value of L minus N) of the L participating conference terminals except the N conference terminals whose audio signals are to be mixed, where L and N are natural numbers and L>N>0; and controlling unit, configured to control L−N−1 encoders (indicating that the number of encoders is equal to the value of L minus (N+1)) except the common encoder among the L−N encoders (indicating that the number of encoders is equal to the value of L minus N) to update encoding status information to synchronize with encoding status information of the common encoder when L−N>0 (L−N indicates that L subtracts N).

A conference system is provided in another embodiment of the present invention. The conference system includes:

L participating conference terminals, configured to send audio signals; and a multi-channel audio processing device, including L encoders that are in one-to-one correspondence with the L participating conference terminals, where:

the multi-channel audio processing device is configured to receive L-channel audio signals from the L participating conference terminals, decode the L-channel audio signals, determine N conference terminals whose audio signals are to be mixed from the participating conference terminals according to the data obtained through decoding, and select an encoder as a common encoder from L−N encoders (indicating that the number of encoders is equal to the value of L minus N) of the L participating conference terminals except the N conference terminals whose audio signals are to be mixed; and the multi-channel audio processing device is further configured to control L−N−1 encoders (indicating that the number of encoders is equal to the value of L minus (N+1)) except the common encoder among the L−N encoders (indicating that the number of encoders is equal to the value of L minus N) to update encoding status information to synchronize with encoding status information of the common encoder, where L and N are natural numbers and L>N>0.

The method, device, and system for processing multi-channel audio signals provided in embodiments of the present invention can greatly save processor resources, thus increasing the number of accessible signal sources such as conference terminals and reducing the cost when the processor resources are fixed, and ensuring that the encoder status information of all conference terminals except the conference terminals whose audio signals are to be mixed is synchronously updated with encoding status information of the common encoder.

BRIEF DESCRIPTION OF THE DRAWINGS

To better illustrate the embodiments of the present invention or technical solutions of the prior art, the drawings below are briefly described for the embodiments of the present invention or the prior art. It is obvious that the drawings merely provide several embodiments of the present invention. Those skilled in the art can obtain other drawings based on these drawings without innovative work.

FIG. 3 is a flowchart of a method for processing multi-channel audio signals provided in an embodiment of the present invention;

DETAILED DESCRIPTION OF ILLUSTRATIVE EMBODIMENTS

The technical solutions of the present invention are elaborated below in the accompanying drawings. Evidently, the embodiments described below are for the exemplary purpose only, without covering all embodiments of the present invention. All the other embodiments obtained by those skilled in the art without creative work based on the embodiments of the present invention are protected by the present invention.

Figure 1:
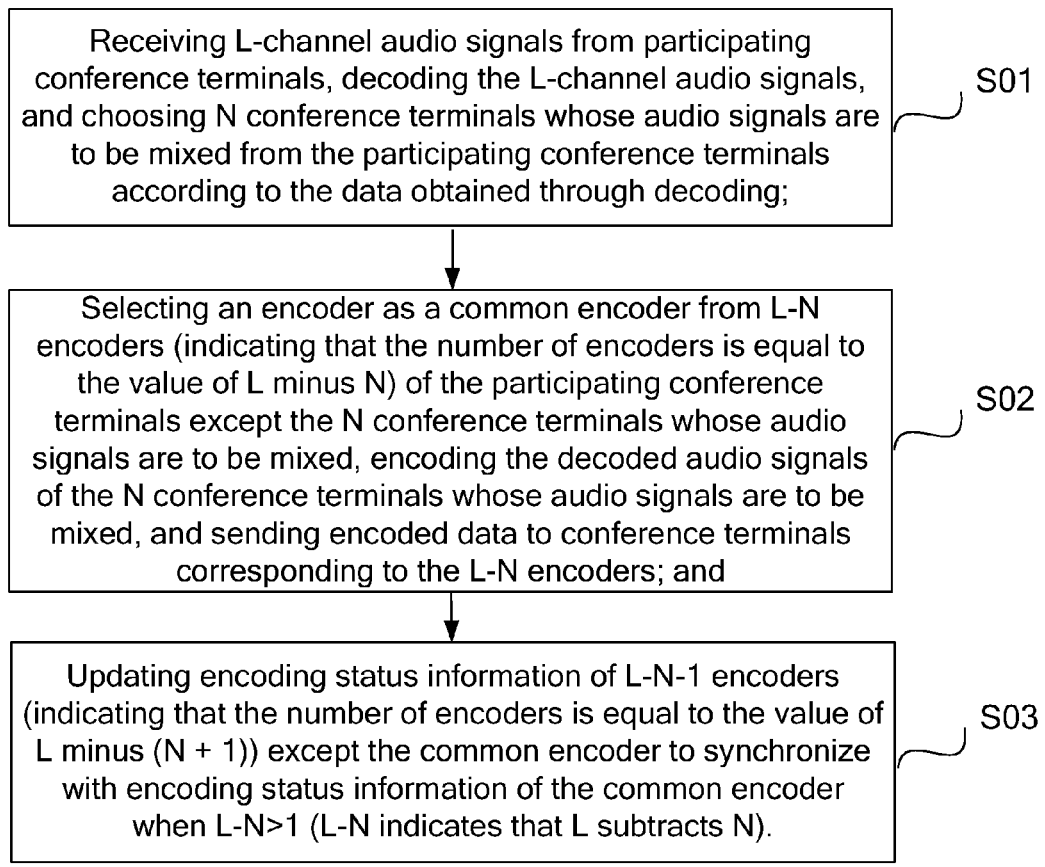
FIG. 1 is a flowchart of a method for processing multi-channel audio signals provided in an embodiment of the present invention.

FIG. 1 is a flow chart of a method for processing multi-channel audio signals provided in an embodiment of the present invention. The method for processing multi-channel audio signals provided in the embodiment includes:

Step 01: L-channel audio signals are received from participating conference terminals, the L-channel audio signals are decoded, and N conference terminals whose audio signals are to be mixed are chosen from the participating conference terminals according to the data obtained through decoding;

Step 02: An encoder is selected from L−N encoders (indicating that the number of encoders is equal to the value of L minus N) of the participating conference terminals except the N conference terminals whose audio signals are to be mixed as a common encoder, decoded audio signals of the N conference terminals whose audio signals are to be mixed are encoded, and encoded data is sent to conference terminals corresponding to the L−N encoders (indicating that the number of encoders is equal to the value of L minus N); and Step 03: Encoding status information of L−N−1 encoders (indicating that the number of encoders is equal to the value of L minus (N+1)) except the common encoder is updated to synchronize with encoding status information of the common encoder when L−N>1 (L−N indicates that L subtracts N).

In the embodiment, L and N are natural numbers, and L>N>0. Take a multi-media conference system for example. In this system, L is 7 and N is 3, which indicates that 7 channels of audio signals are received and 3 conference terminals whose audio signals are to be mixed from the participating conference terminals are chosen. For example, you can preset an audio energy threshold to select the audio signals that exceed the audio energy threshold from the received decoded audio signals to determine the conference terminals corresponding to the selected audio signals as the conference terminals whose audio signals are to be mixed. Alternatively, you can preset the number of audio signals to be selected. For example, in order to select three channels of audio signals, compare the audio energy of the received decoded audio signals with each other, and select top three channels of audio signals with the highest volume from the received audio signals, to determine the conference terminals corresponding to the selected audio signals as the conference terminals whose audio signals are to be mixed. Alternatively, you can use conference terminals to send application signals, and use the control side to determine whether to receive audio signals from these conference terminals, thus to determine the conference terminals corresponding to the selected audio signals as the conference terminals whose audio signals are to be mixed. Evidently, the methods for determining the N conference terminals whose audio signals are to be mixed from the participating conference terminals include but are not limited to the preceding methods. In this embodiment, three conference terminals whose audio signals are to be mixed are selected from the participating conference terminals. The three channels of audio signals come from conference terminals Z1, Z2, and Z3, corresponding to encoders T1, T2, and T3 respectively. The encoder T1 completely encodes the decoded audio signals of conference terminals Z2 and Z3 and sends the encoded data to the conference terminal Z1. The encoder T2 completely encodes the decoded audio signals of conference terminals Z1 and Z3 and sends the encoded data to the conference terminal Z2. The encoder T3 completely encodes the decoded audio signals of conference terminals Z1 and Z2 and sends the encoded data to the conference terminal Z3. Any of the rest L−N encoders (indicating that the number of encoders is equal to the value of L minus N), that is, four encoders, is selected as a common encoder to encode the audio signals decoded by the conference terminals Z1, Z2, and Z3. For example, an encoder T4 is selected as the common encoder to completely encode the audio signals decoded by conference terminals Z1, Z2, and Z3, and send the encoded data to conference terminals Z4 to Z7. The rest three encoders, that is, encoders T5 to T7, update their encoding status information to synchronize with the encoding status information of the common encoder T4. That is, encoders T5 to T7 perform incomplete encoding and stop encoding when the encoding status information is updated. For example, the AAC encoder performs incomplete encoding, and stops encoding when the encoding status information is updated, that is, the AAC encoder does not perform subsequent operations such as time-frequency change and psychological acoustics model analysis.

According to the actual test, when the AAC encoder runs on the DM642 board, the encoding operation volume of the AAC encoder is 60 MB. When the method in the embodiment is adopted, the AAC encoder performs incomplete encoding and stops encoding when the encoding status information is updated, in which the encoding operation volume is 6 MB.

Therefore, the method for processing multi-channel audio signals provided in the embodiment can greatly save processor resources, increase the number of accessible signal sources and reduce the cost when the processor resources are fixed, and ensure that the encoder status information of all conference terminals except the conference terminals whose audio signals are to be mixed is synchronously updated, thereby ensuring that the status information of each encoder is continuous and thus the decoding end correctly decodes signals when N conference terminals, which are top N high-volume ones and can speak at the same time, are changed.

Figure 2:
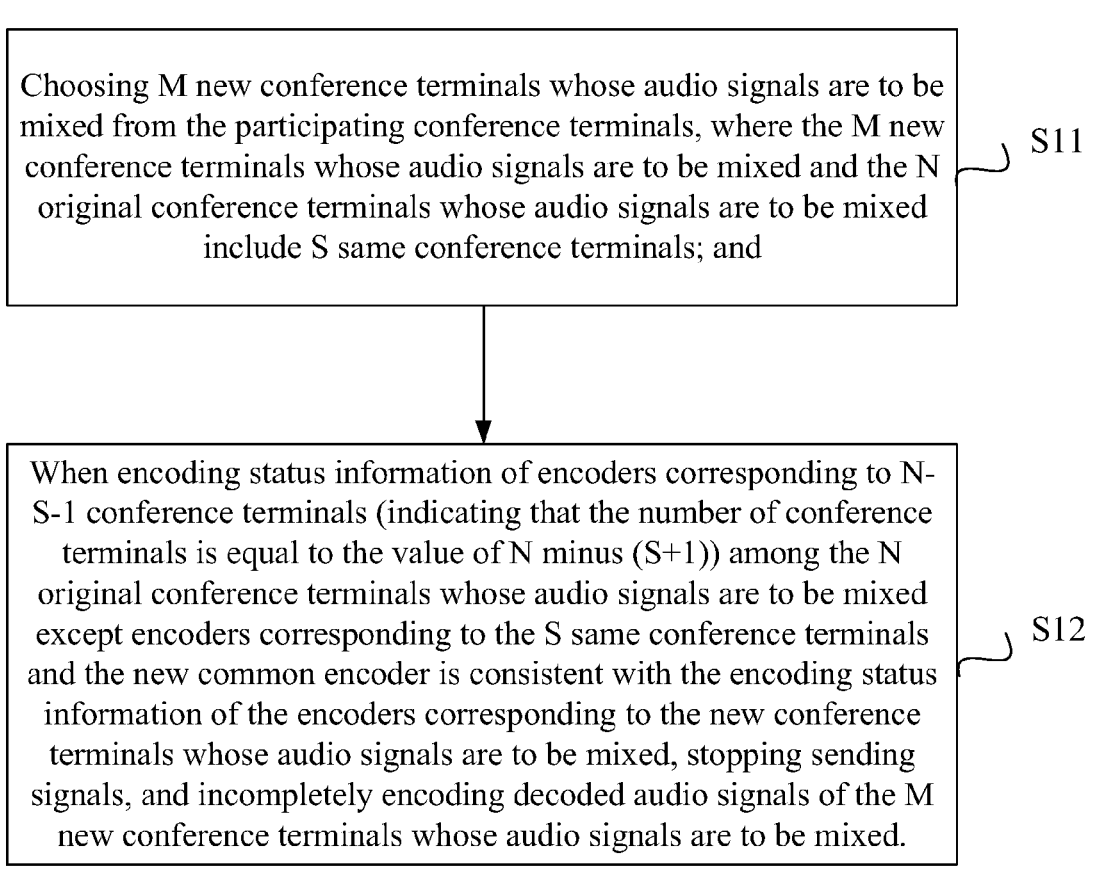
FIG. 2 is a flowchart of a method for processing multi-channel audio signals provided in an embodiment of the present invention.

FIG. 2 is a flow chart of a method for processing multi-channel audio signals provided in an embodiment of the present invention. As shown in FIG. 2, in this embodiment, when the N conference terminals whose audio signals are to be mixed change, and any of the encoders corresponding to the N original conference terminals whose audio signals are to be mixed is selected as a new common encoder, the method also includes:

Step 11: M new conference terminals whose audio signals are to be mixed are chosen from the participating conference terminals, where the M new conference terminals whose audio signals are to be mixed and the N original conference terminals whose audio signals are to be mixed include S same conference terminals; and Step 12: When encoding status information of encoders corresponding to N−S−1 conference terminals (indicating that the number of conference terminals is equal to the value of N minus (S+1)) among the N original conference terminals whose audio signals are to be mixed except encoders corresponding to the S same conference terminals and the new common encoder is consistent with the encoding status information of the encoders corresponding to the new conference terminals whose audio signals are to be mixed, signal sending is stopped, and decoded audio signals of the M new conference terminals whose audio signals are to be mixed are incompletely encoded to synchronize the encoding status information of the encoders corresponding to the N−S−1 conference terminals with the encoding status information of the new common encoder.

In this embodiment, M and S are natural numbers, and $0 \leq S < \min\{M, N\}$. According to the preceding method for determining the conference terminals whose audio signals are to be mixed, M new conference terminals whose audio signals are to be mixed are chosen from the participating conference terminals. The M new conference terminals whose audio signals are to be mixed and the N original conference terminals whose audio signals are to be mixed include S same conference terminals. For example, four new conference terminals, conference terminals Z4 to Z7, whose audio signals are to be mixed are chosen from seven participating conference terminals. At this time, the number of same conference terminals, that is, S, is 0. An encoder, for example, T1, is selected as a common encoder from the encoders corresponding to the original conference terminals whose audio signals are to be mixed. Encoders T1, T2, and T3 completely encode audio signals decoded by conference terminals Z4 to Z7 and send the encoded signals to conference terminals Z1, Z2, and Z3. In addition, an encoder T4 completely encodes audio signals decoded by conference terminals Z5 to Z7 and sends the encoded signals to the conference terminal Z4. An encoder T5 completely encodes audio signals decoded by conference terminals Z4, Z6, and Z7 and sends the encoded signals to the conference terminal Z5. An encoder T6 completely encodes audio signals decoded by conference terminals Z4, Z5, and Z7 and sends the encoded signals to the conference terminal Z6. An encoder T7 completely encodes audio signals decoded by conference terminals Z4 to Z6 and sends the encoded signals to the conference terminal Z7. When encoders T2 and T3 completely encode the audio signals decoded by conference terminals Z4 to Z7 until the encoding status information of these encoders is consistent with the encoding status information of the common encoder T1, encoders T2 and T3 stop sending data to conference terminals Z2 and Z3, and incompletely encode audio signals decoded by conference terminals Z4 to Z7. In addition, the common encoder T1 completely encodes the audio signals decoded by conference terminals Z4 to Z7 and sends the encoded signals to conference terminals Z1, Z2, and Z3.

In this embodiment, for example, five new conference terminals, that is, conference terminals Z3 to Z7, whose audio signals are to be mixed are chosen from seven participating conference terminals. At this time, one same conference terminal, that is, the conference terminal Z3, exists. An encoder, for example, T1, is selected as a common encoder from the encoders corresponding to the original conference terminals whose audio signals are to be mixed. Encoders T1 and T2 completely encode audio signals decoded by conference terminals Z3 to Z7 and send the encoded signals to conference terminals Z1 and Z2. In addition, an encoder T3 completely encodes audio signals decoded by conference terminals Z4 to Z7 and sends the encoded signals to the conference terminal Z3. An encoder T4 completely encodes audio signals decoded by conference terminals Z3, and Z5 to Z7 and sends the encoded signals to the conference terminal Z4. An encoder T5 completely encodes audio signals decoded by conference terminals Z3, Z4, Z6, and Z7 and sends the encoded signals to the conference terminal Z5. An encoder T6 completely encodes audio signals decoded by conference terminals Z3 to Z5, and Z7 and sends the encoded signals to the conference terminal Z6. An encoder T7 completely encodes audio signals decoded by conference terminals Z3 to Z6 and sends the encoded signals to the conference terminal Z7. When the encoder T2 completely encodes the audio signals decoded by conference terminals Z3 to Z7 until the encoding status information of these encoders is consistent with the encoding status information of the common encoder T1, the encoder T2 stops sending data to conference terminals Z2, and incompletely encodes audio signals decoded by conference terminals Z3 to Z7. In addition, the common encoder T1 completely encodes the audio signals decoded by conference terminals Z4 to Z7 and sends the encoded signals to conference terminals Z1 and Z2.

In this way, when the N conference terminals whose audio signals are to be mixed change, and any of the encoders corresponding to the N conference terminals whose audio signals are to be mixed is selected as a new common encoder, the method for processing multi-channel audio signals provided in this embodiment can greatly save processor resources, increase the number of accessible signal sources and reduce the cost when the processor resources are fixed, and ensure that the encoder status information of all conference terminals except the conference terminals whose audio signals are to be mixed is synchronously updated with encoding status information of the common encoder. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

FIG. 3 is a flow chart of a method for processing multi-channel audio signals provided in an embodiment of the present invention. As shown in FIG. 3, in the embodiment, when the N conference terminals whose audio signals are to be mixed change, and none of the encoders corresponding to the N conference terminals whose audio signals are to be mixed is selected as a new common encoder, the method also includes:

Step 21: M new conference terminals whose audio signals are to be mixed are chosen from the participating conference terminals, where the M new conference terminals whose audio signals are to be mixed and the original N conference terminals whose audio signals are to be mixed include S same conference terminals; and Step 22: When the encoding status information of encoders corresponding to N-S conference terminals among the N original conference terminals whose audio signals are to be mixed except encoders corresponding to the S same conference terminals is consistent with the encoding status information of the encoders corresponding to the new conference terminals whose audio signals are to be mixed, signal sending is stopped, and decoded audio signals of the M new conference terminals whose audio signals are to be mixed are incompletely encoded to synchronize the encoding status information of the encoders corresponding to the N-S conference terminals with the encoding status information of the new common encoder.

In this embodiment, M and S are natural numbers, and $0 \leq S < \min\{M, N\}$. According to the preceding method for determining the conference terminals whose audio signals are to be mixed, M new conference terminals whose audio signals are to be mixed are chosen from the participating conference terminals. The M new conference terminals whose audio signals are to be mixed and the N original conference terminals whose audio signals are to be mixed include S same conference terminals. For example, three new conference terminals, conference terminals Z5 to Z7, whose audio signals are to be mixed are chosen from seven participating conference terminals. At this time, the number of same conference terminals, that is, S, is 0. An encoder, for example, T4, is selected as the common encoder from the encoders corresponding to the participating conference terminals except the original conference terminals whose audio signals are to be mixed. Encoders T1 to T4 completely encode audio signals decoded by conference terminals Z5 to Z7 and send the encoded signals to conference terminals Z1 to Z4. In addition, an encoder T5 completely encodes audio signals decoded by conference terminals Z6 and Z7 and sends the encoded signals to the conference terminal Z5. An encoder T6 completely encodes audio signals decoded by conference terminals Z5 and Z7 and sends the encoded signals to the conference terminal Z6. An encoder T7 completely encodes audio signals decoded by conference terminals Z5 and Z6 and sends the encoded signals to the conference terminal Z7. When encoders T1, T2, and T3 completely encode the audio signals decoded by conference terminals Z5 to Z7 until the encoding status information of these encoders is consistent with the encoding status information of the common encoder T4, encoders T1, T2, and T3 stop sending data to conference terminals Z1, Z2, and Z3, and incompletely encode audio signals decoded by conference terminals Z5 to Z7. In addition, the common encoder T4 completely encodes the audio signals decoded by conference terminals Z5 to Z7 and sends the encoded signals to conference terminals Z1, Z2, Z3, and Z4.

In the embodiment, for example, three new conference terminals, that is, conference terminals Z3, Z4, and Z7, whose audio signals are to be mixed are chosen from seven participating conference terminals. One same conference terminal, that is, the conference terminal Z3, exists. An encoder, for example, T5, is selected as the common encoder from the encoders corresponding to the participating conference terminals except the original conference terminals whose audio signals are to be mixed. Encoders T1, T2, T5, and T6 completely encode audio signals decoded by conference terminals Z3, Z4, and Z7 respectively and send the encoded signals to conference terminals Z1, Z2, Z5, and Z6. In addition, an encoder T3 completely encodes audio signals decoded by conference terminals Z4 and Z7 and sends the encoded signals to the conference terminal Z3. An encoder T4 completely encodes audio signals decoded by conference terminals Z3 and Z7 and sends the encoded signals to the conference terminal Z4. An encoder T7 completely encodes audio signals decoded by conference terminals Z3 and Z4 and sends the encoded signals to the conference terminal Z7. When encoders T1, T2, and T6 completely encode the audio signals decoded by conference terminals Z3, Z4, and Z7 until the encoding status information of these encoders is consistent with the encoding status information of the common encoder T5, encoders T1, T2, and T6 stop sending data to conference terminals Z1, Z2, and Z6, and incompletely encode audio signals decoded by conference terminals Z3, Z4, and Z7. In addition, the common encoder T5 completely encodes the audio signals decoded by conference terminals Z3, Z4, and Z7 and sends the encoded signals to conference terminals Z1, Z2, Z5, and Z6.

In this way, when the N conference terminals whose audio signals are to be mixed change, and none of the encoders corresponding to the N conference terminals whose audio signals are to be mixed is selected as a new common encoder, the method for processing multi-channel audio signals provided in the embodiment can greatly save processor resources, increase the number of accessible signal sources and reduce the cost when the processor resources are fixed, and ensure that the encoder status information of all conference terminals except the conference terminals whose audio signals are to be mixed is synchronously updated with encoding status information of the common encoder. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

Figure 4:
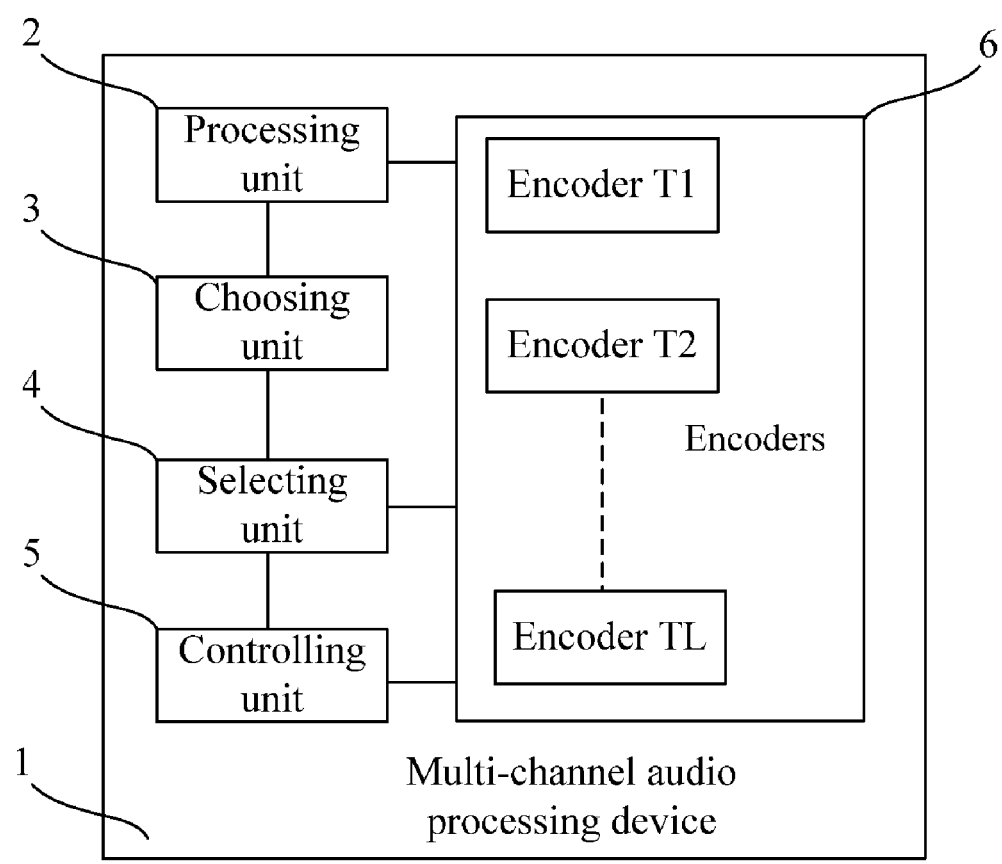
FIG. 4 shows a structure diagram of a device for processing multi-channel audio signals provided in an embodiment of the present invention.

FIG. 4 shows a structure of a device for processing multi-channel audio signals provided in an embodiment of the present invention. As shown in FIG. 4, the device for processing multi-channel audio signals provided in the embodiment includes:

L encoders designated as 6, which are in one-to-one correspondence with participating conference terminals;

a processing unit 2, configured to receive L-channel audio signals from the participating conference terminals and decode the L-channel audio signals respectively;

a choosing unit 3, configured to determine N conference terminals whose audio signals are to be mixed from the participating conference terminals according to data obtained through decoding;

a selecting unit 4, configured to select an encoder from L−N encoders (indicating that the number of encoders is equal to the value of L minus N) of the participating conference terminals except the N conference terminals whose audio signals are to be mixed as a common encoder; and a controlling unit 5, configured to control L−N−1 encoders (indicating that the number of encoders is equal to the value of L minus (N+1)) except the common encoder among the L−N encoders (indicating that the number of encoders is equal to the value of L minus N) to update encoding status information to synchronize with encoding status information of the common encoder when L−N>0 (L−N indicates that L subtracts N).

In this embodiment, L and N are natural numbers, and L>N>0. Take a multi-media conference system in which L is 7 and N is 3 for example. In this system, the processing unit 2 of the multi-channel audio signal processing device 1 receives seven channels of audio signals. The choosing unit 3 determines N conference terminals whose audio signals are to be mixed from the participating terminals. Multiple methods can be used to determine the N conference terminals. For example, you can preset an audio energy threshold to select the audio signals that exceed the audio energy threshold from the received audio signals decoded by the processing unit 2 to determine the conference terminals corresponding to the selected audio signals as the conference terminals whose audio signals are to be mixed. Alternatively, you can preset the number of audio signals to be selected. For example, in order to select three channels of audio signals, compare the audio energy of the received audio signals decoded by the processing unit 2, and select top three channels of audio signals with the highest audio energy from the received audio signals to determine the conference terminals corresponding to the selected audio signals as the conference terminals whose audio signals are to be mixed. Alternatively, you can use conference terminals to send application signals and use the control side to determine whether to receive audio signals from these conference terminals, thus to determine the conference terminals corresponding to the selected audio signals as the conference terminals whose audio signals are to be mixed. In the embodiment, the choosing unit 3 chooses three conference terminals whose audio signals are to be mixed from the participating conference terminals. The three channels of audio signals come from conference terminals Z1, Z2, and Z3, corresponding to encoders T1, T2, and T3 respectively. An encoder T1 completely encodes the decoded audio signals of conference terminals Z2 and Z3 and sends the encoded data to the conference terminal Z1. An encoder T2 completely encodes the decoded audio signals of conference terminals Z1 and Z3 and sends the encoded data to the conference terminal Z2. An encoder T3 completely encodes the decoded audio signals of conference terminals Z1 and Z2 and sends the encoded data to the conference terminal Z3. The selecting unit 4 selects any of the rest L−N encoders (indicating that the number of encoders is equal to the value of L minus N), that is, four encoders, as a common encoder to completely encode the audio signals decoded by conference terminals Z1, Z2, and Z3. For example, an encoder T4 is selected as a common encoder to completely encode the audio signals decoded by conference terminals Z1, Z2, and Z3, and send the encoded data to conference terminals Z4 to Z7. The controlling unit 5 controls the rest three encoders, that is, encoders T5 to T7, to update the encoding status information of the three encoders to synchronize with the encoding status information of the common encoder T4. That is, encoders T5 to T7 perform incomplete encoding and stop encoding when the encoding status information is updated. For example, the AAC encoder performs incomplete encoding and stops encoding when the encoding status information is updated, that is, the AAC encoder does not perform subsequent operations such as time-frequency change and psychological acoustics model analysis.

According to the actual test, when the AAC encoder runs on the DM642 board, the encoding operation volume of the AAC encoder is 60 MB. When the method in the embodiment is adopted, the AAC encoder performs incomplete encoding and stops encoding when the encoding status information is updated, in which the encoding operation volume is 6 MB.

Therefore, the device for processing multi-channel audio signals provided in the embodiment of the present invention can greatly save processor resources, increase the number of accessible signal sources such as conference terminals and reduce the cost when the processor resources are fixed, and ensure that the encoder status information of all conference terminals except the conference terminals whose audio signals are to be mixed is synchronously updated with encoding status information of the common encoder.

A device for processing multi-channel audio signals is provided in an embodiment of the present invention as shown in FIG. 4. The selecting unit 4 is also configured to select any of the encoders, corresponding to the original N conference terminals whose audio signals are to be mixed, as a new common encoder, when the original N conference terminals whose audio signals are to be mixed change, where:

the choosing unit 3 is further configured to choose M new conference terminals whose audio signals are to be mixed from the participating conference terminals, where the M new conference terminals whose audio signals are to be mixed and the N original conference terminals whose audio signals are to be mixed include S same conference terminals; and the controlling unit 5 is further configured to: when encoding status information of encoders corresponding to N−S−1 conference terminals among the N original conference terminals whose audio signals are to be mixed except encoders corresponding to the S same conference terminals and the new common encoder is consistent with the encoding status information of the encoders corresponding to the new conference terminals whose audio signals are to be mixed, stop sending audio signals, and incompletely encode decoded audio signals of the M new conference terminals whose audio signals are to be mixed to synchronize the encoding status information of the encoders corresponding to the N−S−1 conference terminals with the encoding status information of the new common encoder.

In this embodiment, M and S are natural numbers, and $0 \leq S < \min\{M, N\}$. When the N conference terminals whose audio signals are to be mixed change, the choosing unit 3 chooses M new conference terminals whose audio signals are to be mixed from the participating conference terminals. The M new conference terminals whose audio signals are to be mixed and the N original conference terminals whose audio signals are to be mixed include S same conference terminals. For example, the choosing unit 3 chooses four new conference terminals, Z4 to Z7, whose audio signals are to be mixed from seven participating conference terminals. At this time, the number of same conference terminals, that is, S, is 0. The selecting unit 4 selects an encoder, for example, T1, as a common encoder from the encoders corresponding to the original conference terminals whose audio signals are to be mixed. Encoders T1, T2, and T3 completely encode audio signals decoded by conference terminals Z4 to Z7 and send the encoded signals to conference terminals Z1, Z2, and Z3. In addition, an encoder T4 completely encodes audio signals decoded by conference terminals Z5 to Z7 and sends the encoded signals to the conference terminal Z4. An encoder T5 completely encodes audio signals decoded by conference terminals Z4, Z6, and Z7 and sends the encoded signals to the conference terminal Z5. An encoder T6 completely encodes audio signals decoded by conference terminals Z4, Z5, and Z7 and sends the encoded signals to the conference terminal Z6. An encoder T7 completely encodes audio signals decoded by conference terminals Z4 to Z6 and sends the encoded signals to the conference terminal Z7. The controlling unit 5 controls encoders T2 and T3 to stop sending data to conference terminals Z2 and Z3 and incompletely encode audio signals decoded by conference terminals Z4 to Z7 when encoders T2 and T3 completely encode the audio signals decoded by conference terminals Z4 to Z7 until the encoding status information of these encoders is consistent with the encoding status information of the common encoder T1. In addition, the common encoder T1 completely encodes the audio signals decoded by conference terminals Z4 to Z7 and sends the encoded signals to conference terminals Z1, Z2, and Z3.

In the embodiment, for example, the choosing unit 3 chooses five new conference terminals, that is, conference terminals Z3 to Z7, whose audio signals are to be mixed from seven participating conference terminals. At this time, one same conference terminal, that is, the conference terminal Z3, exists. The selecting unit 4 selects an encoder, for example, T1, as a common encoder from the encoders corresponding to the original conference terminals whose audio signals are to be mixed. Encoders T1 and T2 completely encode audio signals decoded by conference terminals Z3 to Z7 and send the encoded signals to conference terminals Z1 and Z2. In addition, an encoder T3 completely encodes audio signals decoded by conference terminals Z4 to Z7 and sends the encoded signals to the conference terminal Z3. An encoder T4 completely encodes audio signals decoded by conference terminals Z3, and Z5 to Z7 and sends the encoded signals to the conference terminal Z4. An encoder T5 completely encodes audio signals decoded by conference terminals Z3, Z4, Z6, and Z7 and sends the encoded signals to the conference terminal Z5. An encoder T6 completely encodes audio signals decoded by conference terminals Z3 to Z5, and Z7 and sends the encoded signals to the conference terminal Z6. An encoder T7 completely encodes audio signals decoded by conference terminals Z3 to Z6 and sends the encoded signals to the conference terminal Z7. The controlling unit 5 controls the encoder T2 to stop sending data to the conference terminal Z2 and incompletely encode audio signals decoded by conference terminals Z3 to Z7 when the encoder T2 completely encodes the audio signals decoded by conference terminals Z3 to Z7 until the encoding status information of these encoders is consistent with the encoding status information of the common encoder T1. In addition, the common encoder T1 completely encodes the audio signals decoded by conference terminals Z4 to Z7 and sends the encoded signals to conference terminals Z1 and Z2.

As such, the device for processing multi-channel audio signals provided in the embodiment can select any of the encoders corresponding to the N conference terminals whose audio signals are to be mixed as a new common encoder when the N conference terminals whose audio signals are to be mixed change, thereby greatly saving processor resources, increasing the number of accessible signal sources and reducing the cost when the processor resources are fixed, and ensuring that the encoder status information of all conference terminals except the conference terminals whose audio signals are to be mixed and the conference terminal which the common encoder is corresponding to is synchronously updated. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

A device for processing multi-channel audio signals is provided in an embodiment of the present invention as shown in FIG. 4. The selecting unit 4 is also configured to select any of the encoders from the L−N encoders (indicating that the number of encoders is equal to the value of L minus N) as a new common encoder, when the original N conference terminals whose audio signals are to be mixed change, where:

the choosing unit 3 is further configured to choose M new conference terminals whose audio signals are to be mixed from the participating conference terminals, where the M new conference terminals whose audio signals are to be mixed and the N original conference terminals whose audio signals are to be mixed include S same conference terminals; and the controlling unit 5 is further configured to: when encoding status information of encoders corresponding to N−S conference terminals among the N original conference terminals whose audio signals are to be mixed except encoders corresponding to the S same conference terminals is consistent with the encoding status information of the encoders corresponding to the new conference terminals whose audio signals are to be mixed, stop signal sending, and incompletely encode decoded audio signals of the M new conference terminals whose audio signals are to be mixed to synchronize the encoding status information of the encoders corresponding to the N−S conference terminals with the encoding status information of the new common encoder.

In the embodiment, M and S are natural numbers, and $0 \leq S < \min\{M, N\}$. For example, the choosing unit 3 chooses three new conference terminals, that is, conference terminals Z5 to Z7, whose audio signals are to be mixed from seven participating conference terminals. The number of same conference terminals, that is, S, is 0. The selecting unit 4 selects an encoder, for example, T4, as a common encoder from the encoders corresponding to the participating conference terminals except the original conference terminals whose audio signals are to be mixed. Encoders T1 to T4 completely encode audio signals decoded by conference terminals Z5 to Z7 and send the encoded signals to conference terminals Z1 to Z4. In addition, an encoder T5 completely encodes audio signals decoded by conference terminals Z6 and Z7 and sends the encoded signals to the conference terminal Z5. An encoder T6 completely encodes audio signals decoded by the conference terminals Z5 and Z7 and sends the encoded signals to the conference terminal Z6. An encoder T7 completely encodes audio signals decoded by conference terminals Z5 and Z6 and sends the encoded signals to the conference terminal Z7. The controlling unit 5 controls encoders T1, T2, and T3 to stop sending data to conference terminals Z1, Z2, and Z3, and incompletely encode audio signals decoded by conference terminals Z5 to Z7 when encoders T1, T2, and T6 completely encode the audio signals decoded by conference terminals Z3, Z4, and Z7 until the encoding status information of these encoders is consistent with the encoding status information of the common encoder T4. In addition, the common encoder T4 completely encodes the audio signals decoded by conference terminals Z5 to Z7 and sends the encoded signals to conference terminals Z1, Z2, Z3, and Z4.

In the embodiment, for example, the choosing unit 3 chooses three new conference terminals, that is, conference terminals Z3, Z4, and Z7, whose audio signals are to be mixed from seven participating conference terminals. One same conference terminal, that is, the conference terminal Z3, exists. The selecting unit 4 selects an encoder, for example, T5, as a common encoder from the encoders corresponding to the participating conference terminals except the original conference terminals whose audio signals are to be mixed. Encoders T1, T2, T5, and T6 completely encode audio signals decoded by conference terminals Z3, Z4, and Z7 and send the encoded signals to conference terminals Z1, Z2, Z5, and Z6. In addition, an encoder T3 completely encodes audio signals decoded by conference terminals Z4 and Z7 and sends the encoded signals to the conference terminal Z3. An encoder T4 completely encodes audio signals decoded by conference terminals Z3 and Z7 and sends the encoded signals to the conference terminal Z4. An encoder T7 completely encodes audio signals decoded by conference terminals Z3 and Z4 and sends the encoded signals to the conference terminal Z7. The controlling unit 5 controls encoders T1, T2, and T6 to stop sending data to conference terminals Z1, Z2, and Z6, and incompletely encode audio signals decoded by conference terminals Z3, Z4, and Z7 when encoders T1, T2, and T6 completely encode the audio signals decoded by conference terminals Z3, Z4, and Z7 until the encoding status information of these encoders is consistent with the encoding status information of the common encoder T5. In addition, the common encoder T5 completely encodes the audio signals decoded by conference terminals Z3, Z4, and Z7 and sends the encoded signals to conference terminals Z1, Z2, Z5, and Z6.

As such, the device for processing multi-channel audio signals provided in the embodiment can select any of the encoders corresponding to the participating conference terminals except the original conference terminals whose audio signals are to be mixed as a new common encoder when the N conference terminals whose audio signals are to be mixed change, thereby greatly saving processor resources, increasing the number of accessible signal sources and reducing the cost when the processor resources are fixed, and ensuring that the encoder status information of all conference terminals except the conference terminals whose audio signals are to be mixed is synchronously updated with encoding status information of the common encoder. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

Figure 5:
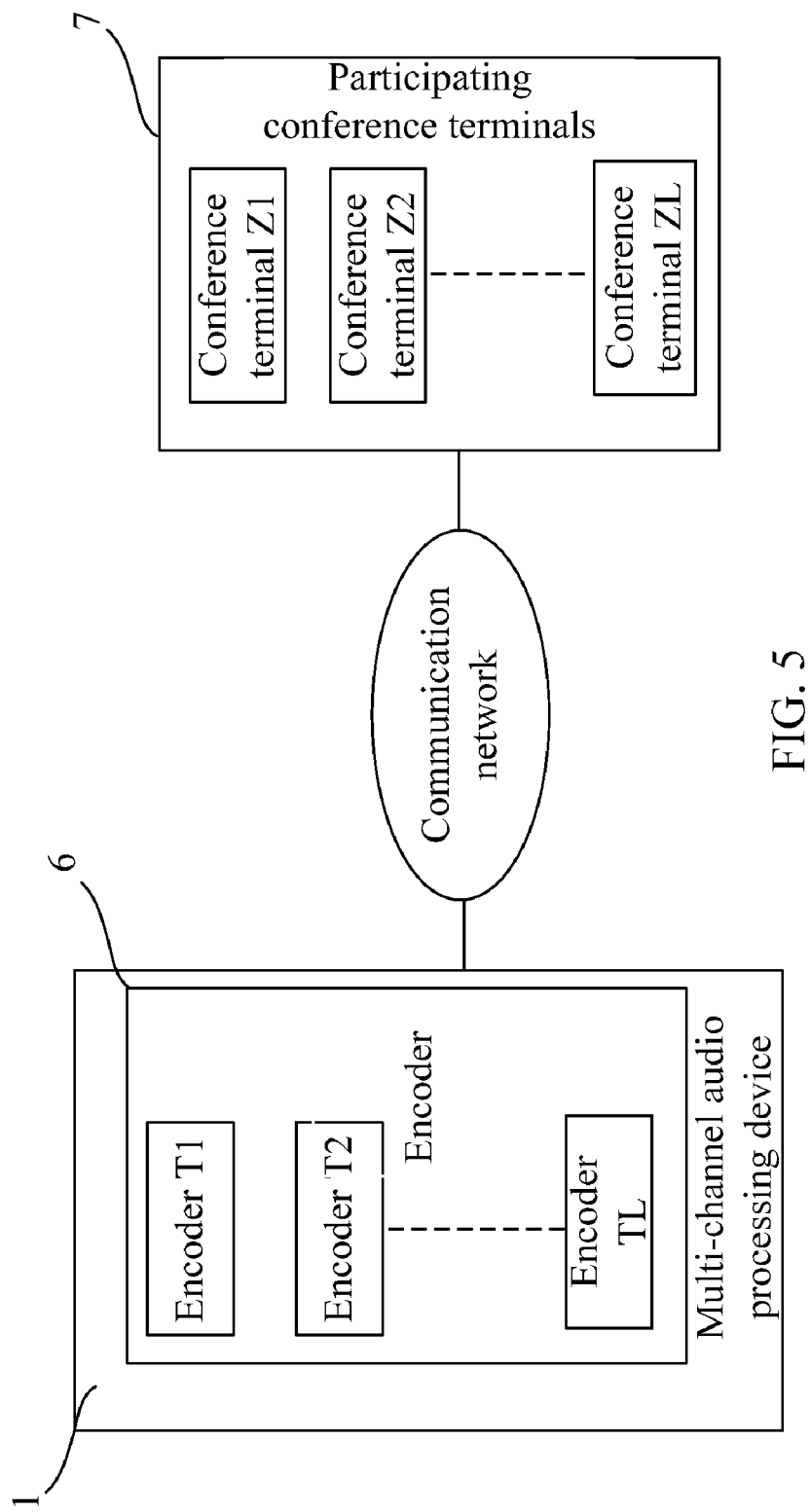
FIG. 5 shows a system diagram of a conference system provided in an embodiment of the present invention.

FIG. 5 shows a structure diagram of a conference system provided in an embodiment of the present invention. As shown in FIG. 5, the conference system in the embodiment includes:

participating conference terminals designated as 7, including conference terminals Z1 to ZL, configured to send audio signals;

a multi-channel audio processing device 1, including encoders designated as 6, that is, encoders T1 to TL, that are in one-to-one correspondence with the L participating conference terminals, where:

the multi-channel audio processing device 1 is configured to: receive L-channel audio signals from participating conference terminals designated as 7, decode the L-channel audio signals, choose and determine N conference terminals whose audio signals are to be mixed from the participating conference terminals according to the data obtained through decoding, and select an encoder as a common encoder from L−N encoders (indicating that the number of encoders is equal to the value of L minus N) of the L participating conference terminals except the N conference terminals whose audio signals are to be mixed; and update encoding status information of L−N−1 encoders (indicating that the number of encoders is equal to the value of L minus (N+1)) except the common encoder to synchronize with encoding status information of the common encoder when L−N>1 (L−N indicates that L subtracts N).

In the embodiment, L and N are natural numbers, and L>N>0. Take a multi-media conference system in which L is 7 and N is 3 for example. In this system, seven channels of audio signals are sent to the multi-channel audio processing device 1, and the multi-channel audio processing device 1 receives seven channels of audio signals and chooses N conference terminals whose audio signals are to be mixed from the participating conference terminals designated as 7. Multiple methods can be adopted to determine N conference terminals whose audio signals are to be mixed from the participating conference terminals designated as 7. For example, you can preset an audio energy threshold to select the audio signals that exceed the audio energy threshold from the received decoded audio signals, so as to determine the conference terminals corresponding to the selected audio signals as the conference terminals whose audio signals are to be mixed. Alternatively, you can preset the number of audio signals to be selected. For example, in order to select three channels of audio signals, compare the audio energy of the received decoded audio signals, and select top three channels of audio signals with the highest audio energy from the received audio signals, so as to determine the conference terminals corresponding to the selected audio signals as the conference terminals whose audio signals are to be mixed. Alternatively, you can use conference terminals to send application signals and use the control side to determine whether to receive audio signals from these conference terminals, thus to determine the conference terminals corresponding to the selected audio signals as the conference terminals whose audio signals are to be mixed. In the embodiment, the multi-channel audio processing device 1 chooses three conference terminals whose audio signals are to be mixed from the participating conference terminals designated as 7. The three channels of audio signals come from conference terminals Z1, Z2, and Z3, corresponding to encoders T1, T2, and T3. The encoder T1 completely encodes the decoded audio signals of conference terminals Z2 and Z3 and sends the encoded data to the conference terminal Z1. The encoder T2 completely encodes the decoded audio signals of conference terminals Z1 and Z3 and sends the encoded data to the conference terminal Z2. The encoder T3 completely encodes the decoded audio signals of conference terminals Z1 and Z2 and sends the encoded data to the conference terminal Z3. Any of the rest L−N encoders (indicating that the number of encoders is equal to the value of L minus N), that is, four encoders, is selected as a common encoder to completely encode the audio signals decoded by conference terminals Z1, Z2, and Z3. For example, an encoder T4 is selected as the common encoder to completely encode the audio signals decoded by conference terminals Z1, Z2, and Z3, and send the encoded data to conference terminals Z4 to Z7. The rest three encoders, that is, encoders T5 to T7, update their encoding status information to synchronize with the encoding status information of the common encoder T4. That is, encoders T5 to T7 perform incomplete encoding and stop encoding when the encoding status information is updated. For example, the AAC encoder performs incomplete encoding and stops encoding when the encoding status information is updated, that is, the AAC encoder does not perform subsequent operations such as time-frequency change and psychological acoustics model analysis.

According to the actual test, when the AAC encoder runs on the DM642 board, the encoding operation volume of the AAC encoder is 60 MB. When the method in the embodiment is adopted, the AAC encoder performs incomplete encoding and stops encoding when the encoding status information is updated, in which the encoding operation volume is 6 MB.

Therefore, the conference system provided in the embodiment of the present invention can greatly save processor resources, increase the number of accessible signal sources and reduce the cost when the processor resources are fixed, and ensure that the encoder status information of all conference terminals except the conference terminals whose audio signals are to be mixed is synchronously updated with encoding status information of the common encoder.

In the conference system provided in the embodiment as shown in FIG. 5 in the present invention, the multi-channel audio processing device 1 is further configured to: when the N conference terminals whose audio signals are to be mixed change, select any of the encoders corresponding to the original N conference terminals whose audio signals are to be mixed as a new common encoder; choose M new conference terminals whose audio signals are to be mixed from the L participating conference terminals designated as 7, where the M new conference terminals whose audio signals are to be mixed and the original N conference terminals whose audio signals are to be mixed include S same conference terminals; control encoders corresponding to N−S−1 conference terminals among the N original conference terminals whose audio signals are to be mixed except encoders corresponding to the S same conference terminals and the new common encoder to stop sending signals and incompletely encode decoded audio signals of the M new conference terminals whose audio signals are to be mixed when encoding status information of encoders corresponding to N−S−1 conference terminals is consistent with the encoding status information of the encoders corresponding to the new conference terminals whose audio signals are to mixed to synchronize the encoding status information of the encoders corresponding to the N−S−1 conference terminals with the encoding status information of the new common encoder.

In the embodiment, M and S are natural numbers, and $0 \leq S < \min\{M, N\}$. When the N conference terminals whose audio signals are to be mixed change, the multi-channel audio processing device 1 chooses M new conference terminals whose audio signals are to be mixed from the participating conference terminals designated as 7. The M new conference terminals whose audio signals are to be mixed and the N original conference terminals whose audio signals are to be mixed include S same conference terminals. For example, the multi-channel audio processing device 1 chooses four new conference terminals, conference terminals Z4 to Z7, whose audio signals are to be mixed from seven participating conference terminals. At this time, the number of same conference terminals, that is, S, is 0. The multi-channel audio processing device 1 selects an encoder, for example, T1, as a common encoder from the encoders corresponding to the original conference terminals whose audio signals are to be mixed. Encoders T1, T2, and T3 completely encode audio signals decoded by conference terminals Z4 to Z7 and send the encoded signals to conference terminals Z1, Z2, and Z3. In addition, an encoder T4 completely encodes audio signals decoded by conference terminals Z5 to Z7 and sends the encoded signals to the conference terminal Z4. An encoder T5 completely encodes audio signals decoded by conference terminals Z4, Z6, and Z7 and sends the encoded signals to the conference terminal Z5. An encoder T6 completely encodes audio signals decoded by conference terminals Z4, Z5, and Z7 and sends the encoded signals to the conference terminal Z6. An encoder T7 completely encodes audio signals decoded by conference terminals Z4 to Z6 and sends the encoded signals to the conference terminal Z7. The controlling unit 5 controls encoders T2 and T3 to stop sending data to conference terminals Z2 and Z3 and incompletely encode audio signals decoded by conference terminals Z4 to Z7 when encoders T2 and T3 completely encode the audio signals decoded by conference terminals Z4 to Z7 until the encoding status information of these encoders is consistent with the encoding status information of the common encoder T1. In addition, the common encoder T1 completely encodes the audio signals decoded by conference terminals Z4 to Z7 and sends the encoded signals to conference terminals Z1, Z2, and Z3.

In this embodiment, for example, the multi-channel audio processing device 1 chooses five new conference terminals, that is, conference terminals Z3 to Z7, whose audio signals are to be mixed from seven participating conference terminals. At this time, one same conference terminal, that is, the conference terminal Z3, exists. An encoder, for example, T1, is selected as a common encoder from the encoders corresponding to the original conference terminals whose audio signals are to be mixed. Encoders T1 and T2 completely encode audio signals decoded by conference terminals Z3 to Z7 and send the encoded signals to conference terminals Z1 and Z2. In addition, an encoder T3 completely encodes audio signals decoded by conference terminals Z4 to Z7 and sends the encoded signals to the conference terminal Z3. An encoder T4 completely encodes audio signals decoded by conference terminals Z3, and Z5 to Z7 and sends the encoded signals to the conference terminal Z4. An encoder T5 completely encodes audio signals decoded by conference terminals Z3, Z4, Z6, and Z7 and sends the encoded signals to the conference terminal Z5. An encoder T6 completely encodes audio signals decoded by conference terminals Z3 to Z5, and Z7 and sends the encoded signals to the conference terminal Z6. An encoder T7 completely encodes audio signals decoded by conference terminals Z3 to Z6 and sends the encoded signals to the conference terminal Z7. When the encoder T2 completely encodes the audio signals decoded by conference terminals Z3 to Z7 until the encoding status information of these encoders is consistent with the encoding status information of the common encoder T1, the encoder T2 stops sending data to the conference terminal Z2, and incompletely encodes audio signals decoded by conference terminals Z3 to Z7. In addition, the common encoder T1 completely encodes the audio signals decoded by conference terminals Z4 to Z7 and sends the encoded signals to conference terminals Z1 and Z2.

As such, the conference system provided in the embodiment can select any of the encoders corresponding to the N conference terminals whose audio signals are to be mixed as a new common encoder when the N conference terminals whose audio signals are to be mixed change, thereby greatly saving processor resources, increasing the number of accessible signal sources and reducing the cost when the processor resources are fixed, and ensuring that the encoder status information of all conference terminals except the conference terminals whose audio signals are to be mixed is synchronously updated with encoding status information of the common encoder. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

In the conference system provided in the embodiment as shown in FIG. 5 in the present invention, the multi-channel audio processing device 1 is further configured to: when the N conference terminals whose audio signals are to be mixed change, select any of the L−N encoders (indicating that the number of encoders is equal to the value of L minus N) as a new common encoder; choose M new conference terminals whose audio signals are to be mixed from the L participating conference terminals designated as 7, where the M new conference terminals whose audio signals are to be mixed and the original N conference terminals whose audio signals are to be mixed include S same conference terminals; control encoders corresponding to N−S conference terminals among the N original conference terminals whose audio signals are to be mixed except encoders corresponding to the S same conference terminals to stop sending signals and incompletely encode decoded audio signals of the M new conference terminals whose audio signals are to be mixed when encoding status information of encoders corresponding to N−S conference terminals among the N original conference terminals whose audio signals are to be mixed except encoders corresponding to the S same conference terminals is consistent with the encoding status information of the encoders corresponding to the new conference terminals whose audio signals are to mixed to synchronize the encoding status information of the encoders corresponding to the N−S conference terminals with the encoding status information of the new common encoder.

In the embodiment, M and S are natural numbers, and $0 \leq S < \min\{M, N\}$. When the N conference terminals whose audio signals are to be mixed change, the multi-channel audio processing device 1 chooses M new conference terminals whose audio signals are to be mixed from the participating conference terminals. The M new conference terminals whose audio signals are to be mixed and the N original conference terminals whose audio signals are to be mixed include S same conference terminals. For example, the multi-channel audio processing device 1 chooses three new conference terminals, conference terminals Z5 to Z7, whose audio signals are to be mixed from seven participating conference terminals. At this time, the number of same conference terminals, that is, S, is 0. The multi-channel audio processing device 1 selects an encoder, for example, T4, as a common encoder from the encoders corresponding to the participating conference terminals except the original conference terminals whose audio signals are to be mixed. Encoders T1 to T4 completely encode audio signals decoded by conference terminals Z5 to Z7 and send the encoded signals to conference terminals Z1 to Z4. In addition, an encoder T5 completely encodes audio signals decoded by conference terminals Z6 and Z7 and sends the encoded signals to the conference terminal Z5. An encoder T6 completely encodes audio signals decoded by conference terminals Z5 and Z7 and sends the encoded signals to the conference terminal Z6. An encoder T7 completely encodes audio signals decoded by conference terminals Z5 and Z6 and sends the encoded signals to the conference terminal Z7. When encoders T1, T2, and T3 completely encode the audio signals decoded by conference terminals Z5 to Z7 until the encoding status information of these encoders is consistent with the encoding status information of the common encoder T4, encoders T1, T2, and T3 stop sending data to conference terminals Z1, Z2, and Z3, and incompletely encode audio signals decoded by conference terminals Z5 to Z7. In addition, the common encoder T4 completely encodes the audio signals decoded by conference terminals Z5 to Z7 and sends the encoded signals to conference terminals Z1, Z2, Z3, and Z4.

In the embodiment, for example, the multi-channel audio processing device 1 chooses three new conference terminals, that is, conference terminals Z3, Z4, and Z7, whose audio signals are to be mixed from seven participating conference terminals. One same conference terminal, that is, the conference terminal Z3, exists. The multi-channel audio processing device 1 selects an encoder, for example, T5, as a common encoder from the encoders corresponding to the participating conference terminals except the original conference terminals whose audio signals are to be mixed. Encoders T1, T2, T5, and T6 completely encode audio signals decoded by conference terminals Z3, Z4, and Z7 and send the encoded signals to conference terminals Z1, Z2, Z5, and Z6. In addition, an encoder T3 completely encodes audio signals decoded by conference terminals Z4 and Z7 and sends the encoded signals to the conference terminal Z3. An encoder T4 completely encodes audio signals decoded by conference terminals Z3 and Z7 and sends the encoded signals to the conference terminal Z4. An encoder T7 completely encodes audio signals decoded by conference terminals Z3 and Z4 and sends the encoded signals to the conference terminal Z7. When encoders T1, T2, and T6 completely encode the audio signals decoded by conference terminals Z3, Z4, and Z7 until the encoding status information of these encoders is consistent with the encoding status information of the common encoder T5, encoders T1, T2, and T6 stop sending data to conference terminals Z1, Z2, and Z6, and incompletely encode audio signals decoded by conference terminals Z3, Z4, and Z7. In addition, the common encoder T5 completely encodes the audio signals decoded by conference terminals Z3, Z4, and Z7 and sends the encoded signals to conference terminals Z1, Z2, Z5, and Z6.

In this way, the conference system provided in the embodiment can select any of the encoders, corresponding to the participating conference terminals designated as 7 except the original conference terminals whose audio signals are to be mixed, as a new common encoder when the N conference terminals whose audio signals are to be mixed change, thereby greatly saving processor resources, increasing the number of accessible signal sources and reducing the cost when the processor resources are fixed, and ensuring that the encoder status information of all conference terminals except the conference terminals whose audio signals are to be mixed is synchronously updated with encoding status information of the common encoder. In addition, when the conference terminals whose audio signals are to be mixed change, encoders can implement encoding by predicting frames to allow smooth transition of the encoding status information of encoders and the decoding status information of decoders of the conference terminals. Then, the common encoder sends data to the participating conference terminals except the new conference terminals whose audio signals are to be mixed. In this way, when the conference terminals whose audio signals are to be mixed change, the conference terminals can normally decode audio signals and ensure the audio quality.

The protection scope of the invention is not confined to the exemplary embodiments of the present invention. This invention is intended to cover all the modifications, equivalent replacements, and improvements of this invention provided that they fall in the scope of the spirit and principles of this invention.

In addition, the technologies, systems, devices, methods, and technical features stated in the preceding embodiments can be combined to form other modules, methods, devices, systems, or technologies that fall within the spirit and principle of the present invention. All these modules, methods, devices, systems, and technologies formed by combining the descriptions in the preceding embodiments of the present invention fall within the protection scope of the present invention.

What is claimed is:

1. A method for processing multi-channel audio signals, comprising:

receiving L-channel audio signals from participating conference terminals, decoding the L-channel audio signals, and determining N conference terminals whose audio signals are to be mixed from the participating conference terminals according to the data obtained through decoding, wherein L and N are natural numbers and L>N>0;

selecting an encoder as a common encoder from L−N encoders (indicating that the number of encoders is equal to the value of L minus N) of the participating conference terminals except the N conference terminals whose audio signals are to be mixed, encoding decoded audio signals of the N conference terminals whose audio signals are to be mixed, and sending encoded data to conference terminals corresponding to the L−N encoders (indicating that the number of encoders is equal to the value of L minus N);

wherein, when the N conference terminals whose audio signals are to be mixed change, and any of the encoders corresponding to the N conference terminals whose audio signals are to be mixed is selected as a new common encoder, the method also comprising:

choosing M new conference terminals whose audio signals are to be mixed from the participating conference terminals, wherein the M new conference terminals whose audio signals are to be mixed and the N original conference terminals whose audio signals are to be mixed include S same conference terminals, wherein M and S are natural numbers and 0<=S<min{M,N}; and stopping sending signals, and incompletely encoding decoded audio signals of the M new conference terminals whose audio signals are to be mixed when encoding status information of encoders corresponding to N-S-1 conference terminals (indicating that the number of conference terminals is equal to the value of N minus (S+I)) among the N original conference terminals whose audio signals are to be mixed except encoders corresponding to the S same conference terminals and the new common encoder is consistent with the encoding status information of the encoders corresponding to the new conference terminals whose audio signals are to be mixed to synchronize the encoding status information of the encoders corresponding to the N-S-1 conference terminals with the encoding status information of the new common encoder; and updating encoding status information of L−N−1 encoders (indicating that the number of encoders is equal to the value of L minus (N+I) except the common encoder to synchronize with encoding status information of the common encoder when L−N>I (L−N indicates that L subtracts N).

2. The method according to claim 1, wherein, when the N conference terminals whose audio signals are to be mixed change and none of the encoders corresponding to the N conference terminals whose audio signals are to be mixed is selected as a new common encoder, the method further comprises:

choosing M new conference terminals whose audio signals are to be mixed from the participating conference terminals, wherein the M new conference terminals whose audio signals are to be mixed and the N original conference terminals whose audio signals are to be mixed include S same conference terminals, wherein M and S are natural numbers and $0 \leq S \leq \min\{M, N\}$; stopping sending signals, and incompletely encoding decoded audio signals of the M new conference terminals whose audio signals are to be mixed when encoding status information of encoders corresponding to N–S conference terminals among the N original conference terminals whose audio signals are to be mixed except encoders corresponding to the S same conference terminals is consistent with the encoding status information of encoders corresponding to the new conference terminals whose audio signals are to be mixed to synchronize the encoding status information of the encoders corresponding to the N-S conference terminals with the encoding status information of the new common encoder, where the term N-S indicates that the number of conference terminals is equal to the value of N minus S.

3. A device for processing multi-channel audio signals, comprising:

L encoders in one-to-one correspondence with participating conference terminals;

a processing unit, configured to receive L-channel audio signals from the participating conference terminals and decode the L-channel audio signals respectively;

a choosing unit, configured to choose and determine N conference terminals whose audio signals are to be mixed from the participating conference terminals according to data obtained through decoding;

a selecting unit, configured to select an encoder as a common encoder from L–N encoders (indicating that the number of encoders is equal to the value of L minus N) of the L participating conference terminals except the N conference terminals whose audio signals are to be mixed, wherein L and N are natural numbers and L>N>0; and a controlling unit, configured to control L–N–1 encoders (indicating that the number of encoders is equal to the value of L minus (N+I)) among the L–N encoders (indicating that the number of encoders is equal to the value of L minus N) except the common encoder to update encoding status information to synchronize with encoding status information of the common encoder when L–N>0 (L–N indicates that L subtracts N); wherein, the selecting unit is further configured to select any of the encoders as a new common encoder from the L–N encoders (indicating that the number of encoders is equal to the value of L minus N) when the original N conference terminals whose audio signals are to be mixed change;

the choosing unit is further configured to choose M new conference terminals whose audio signals are to be mixed from the participating conference terminals, wherein the M new conference terminals whose audio signals are to be mixed and the N original conference terminals whose audio signals are to be mixed include S same conference terminals, wherein M and S are natural numbers and $0<=S<\min\{M,N\}$; and the controlling unit is further configured to: when encoding status information of encoders corresponding to N-S-1 conference terminals among the N original conference terminals whose audio signals are to be mixed except encoders corresponding to the S same conference terminals and the new common encoder is consistent with the encoding status information of the encoders corresponding to the new conference terminals whose audio signals are to be mixed, stop sending signals, and incompletely encode decoded audio signals of the M new conference terminals whose audio signals are to be mixed to synchronize the encoding status information of the encoders corresponding to the N-S-1 conference terminals with the encoding status information of the new common encoder.

4. The device of claim 3, wherein the selecting unit is further configured to select any of the encoders as a new common encoder from the L–N encoders when the N conference terminals whose audio signals are to be mixed change;

the choosing unit is further configured to choose M new conference terminals whose audio signals are to be mixed from the participating conference terminals, wherein the M new conference terminals whose audio signals are to be mixed and the N original conference terminals whose audio signals are to be mixed include S same conference terminals, wherein M and S are natural numbers and $0 \leq S \leq \min\{M, N\}$; and the controlling unit is further configured to when encoding status information of encoders corresponding to N-S conference terminals among the N original conference terminals whose audio signals are to be mixed except encoders corresponding to the S same conference terminals is consistent with the encoding status information of the encoders corresponding to the new conference terminals whose audio signals are to be mixed, stop sending signals, and to incompletely encode decoded audio signals of the M new conference terminals whose audio signals are to be mixed to synchronize the encoding status information of the encoders corresponding to the N-S conference terminals with the encoding status information of the new common encoder.

5. A conference system, comprising:

L participating conference terminals, configured to send audio signals; and a multi-channel audio processing device, including L encoders that are in one-to-one correspondence with the L participating conference terminals, wherein:

the multi-channel audio processing device is configured to receive L-channel audio signals from the L participating conference terminals, decode the L-channel audio signals respectively, determine N conference terminals whose audio signals are to be mixed from the participating conference terminals according to the data obtained through decoding, and select an encoder as a common encoder from L–N encoders (indicating that the number of encoders is equal to the value of L minus N) of the L participating conference terminals except the N conference terminals whose audio signals are to be mixed; and the multi-channel audio processing device is further configured to: when L–N>I (L–N indicates that L subtracts N), control L–N–1 encoders (indicating that the number of encoders is equal to the value of L minus (N+I)) except the common encoder among the L–N encoders (indicating that the number of encoders is equal to the value of L minus N) to update encoding status information to synchronize with encoding status information of the common encoder, wherein L and N are natural numbers and L>N>0; wherein the multi-channel audio processing device is further configured to: when the N conference terminals whose audio signals are to be mixed change, select any of the encoders, corresponding to the original N conference terminals whose audio signals are to be mixed, as a new common encoder; choose M new conference terminals whose audio signals are to be mixed from the L participating conference terminals, wherein the M new conference terminals whose audio signals are to be mixed and the original N conference terminals whose audio signals are to be mixed include S same conference terminals; control encoders corresponding to N-S-1 conference terminals among the N original conference terminals whose audio signals are to be mixed except encoders corresponding to the S same conference terminals and the new common encoder to stop sending signals and incompletely encode decoded audio signals of the M new conference terminals whose audio signals are to be mixed when encoding status information of encoders corresponding to N-S-1 conference terminals among the N original conference terminals whose audio signals are to be mixed except encoders corresponding to the S same conference terminals and the new common encoder is consistent with the encoding status information of the encoders corresponding to the new conference terminals whose audio signals are to mixed to synchronize the encoding status information of the encoders corresponding to the N-S-1 conference terminals with the encoding status information of the new common encoder, wherein M and S are natural numbers and $0 <= S < \min\{M,N\}$.

6. The system according to claim 5, wherein the multi-channel audio processing device is further configured to, when the N conference terminals whose audio signals are to be mixed change, select any of the L-N encoders as a new common encoder; to choose M new conference terminals whose audio signals are to be mixed from the L participating conference terminals, wherein the M new conference terminals whose audio signals are to be mixed and the original N conference terminals whose audio signals are to be mixed include S same conference terminals; to control encoders corresponding to N-S conference terminals among the N original conference terminals whose audio signals are to be mixed except encoders corresponding to the S same conference terminals to stop sending signals and to incompletely encode decoded audio signals of the M new conference terminals whose audio signals are to be mixed when encoding status information of encoders corresponding to N-S conference terminals among the N original conference terminals whose audio signals are to be mixed except encoders corresponding to the S same conference terminals is consistent with the encoding status information of the encoders corresponding to the new conference terminals whose audio signals are to mixed to synchronize the encoding status information of the encoders corresponding to the N-S conference terminals with the encoding status information of the new common encoder, wherein M and S are natural numbers and $0 \leq S \leq \min\{M, N\}$.

* * * * *